(12) United States Patent
Shigeno et al.

(10) Patent No.: US 8,615,811 B2
(45) Date of Patent: Dec. 24, 2013

(54) METHOD OF MEASURING VIBRATION CHARACTERISTICS OF CANTILEVER

(75) Inventors: Masatsugu Shigeno, Chiba (JP); Yoshiteru Shikakura, Chiba (JP)

(73) Assignee: SII NanoTechnology Inc. (JP)

( * ) Notice: Subject to any disclaimer, the term of this patent is extended or adjusted under 35 U.S.C. 154(b) by 0 days.

(21) Appl. No.: 13/428,136

(22) Filed: Mar. 23, 2012

(65) Prior Publication Data

US 2012/0246768 A1 Sep. 27, 2012

(30) Foreign Application Priority Data

Mar. 25, 2011 (JP) ................................. 2011-068038

(51) Int. Cl.
*G01Q 20/00* (2010.01)

(52) U.S. Cl.
USPC .......... 850/5; 850/8; 850/10; 850/11; 850/37; 850/39

(58) Field of Classification Search
USPC ......... 250/5, 8, 10, 11, 19, 21, 33, 37, 38, 39, 250/53
See application file for complete search history.

(56) References Cited

U.S. PATENT DOCUMENTS

| 8,018,294 | B2* | 9/2011 | Watanabe | 331/154 |
| 2002/0063213 | A1* | 5/2002 | Itsuji et al. | 250/306 |
| 2007/0290130 | A1* | 12/2007 | Shikakura et al. | 250/306 |

FOREIGN PATENT DOCUMENTS

JP 07174767 7/1995

* cited by examiner

*Primary Examiner* — Michael Logie
(74) *Attorney, Agent, or Firm* — Adams & Wilks (57) ABSTRACT

A method of measuring vibration characteristics of a cantilever in a scanning probe microscope (SPM). An excitation signal is generated by a forward and backward frequency sweep signal in a frequency range including a resonance frequency of the cantilever. The cantilever is vibrated by supplying the excitation signal to a vibrating portion of the cantilever. The largest amplitude of a displacement of the cantilever in a forward path and in a backward path is directly measured, and an intermediate value of a frequency between frequencies measured on the basis of the directly measured largest amplitude of the displacement of the cantilever is detected as the resonance frequency of the cantilever.

13 Claims, 9 Drawing Sheets

PRIOR ART

FIG. 7

PRIOR ART

FIG. 8

PRIOR ART

FIG. 9

METHOD OF MEASURING VIBRATION CHARACTERISTICS OF CANTILEVER

BACKGROUND OF THE INVENTION

1. Field of the Invention

The present invention relates to a probe microscope to be used with vibration at a frequency close to a resonance frequency of a cantilever, and more particularly, to a method of measuring vibration characteristics of a cantilever.

2. Description of the Related Art

In recent years, owing to progress in nanotechnology using a semiconductor process, cantilevers having leaf spring characteristics are used in various devices and sensors to conduct various measurements for shape observation, mass, viscoelasticity, magnetic force, and the like. A scanning probe microscope (SPM) includes a cantilever supported in a cantilever state. A surface of a sample is scanned with a probe provided at a tip end of the cantilever. A tunnel current, an interatomic force, a magnetic force, or viscoelasticity, which acts between the probe and the sample, is measured as the amount of bending (displacement) of the cantilever. Therefore, surface shapes or physical properties of the sample may be measured for imaging, and hence the cantilever is used in various fields.

There are proposed many measuring methods using a dynamic force mode (DFM) for detecting a weak force or an interaction with high sensitivity, by vibrating the cantilever of the scanning probe microscope at a frequency close to the resonance frequency of the cantilever, so as to measure an amplitude, a phase, frequency variation, or the like of the vibration.

When measuring frequency-amplitude characteristics (Q curve), an excitation frequency of the cantilever to be used is swept in a range including the resonance frequency thereof in a time related to a response property thereof so as to measure the frequency-amplitude characteristics (Q curve) for detecting the resonance frequency. When the sweep is performed in a long period of time, a frequency at the largest amplitude is liable to match with the resonance frequency. Therefore, the frequency at the largest amplitude can be detected as the resonance frequency (for example, see Japanese Patent Application Laid-open No. Hei 07-174767). An example of conventional and general measurement of frequency-amplitude characteristics is described below.

Figure 7:
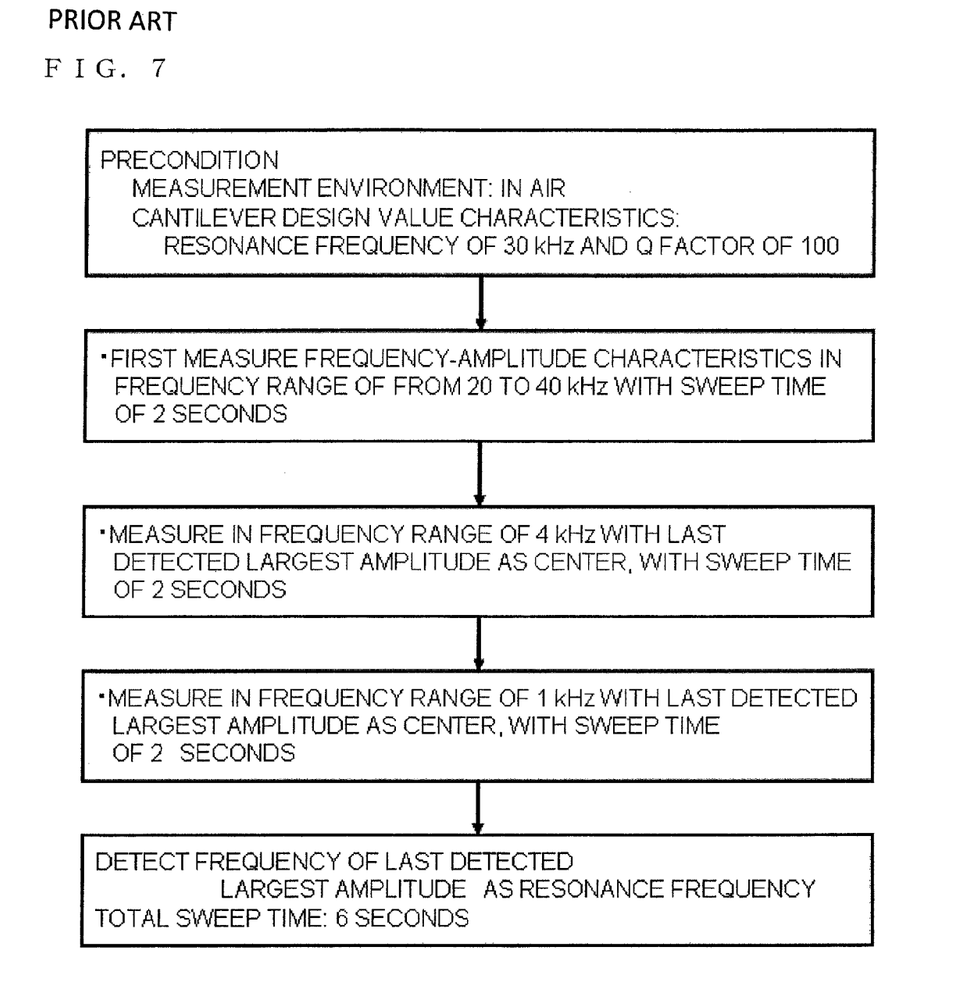
FIG. 7 illustrates a procedure of conventional and general measurement of frequency-amplitude characteristics in the air.
Figure 9:
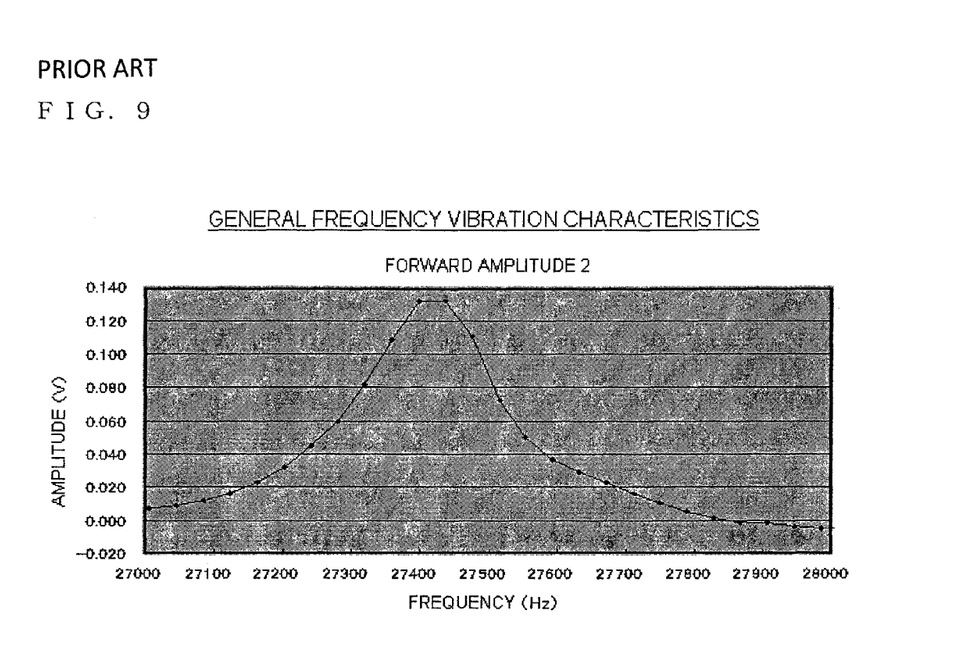
FIG. 9 illustrates an example of general measurement of frequency vibration characteristics (Q curve).

FIG. 7 is a diagram illustrating a procedure of the conventional and general measurement of frequency-amplitude characteristics in the air. In the air, through use of a common cantilever manufactured in accordance with design values of a resonance frequency of 30 kHz and a Q factor of approximately 100, (i) measurement is performed first in a frequency range of from 20 to 40 kHz with a sweep time of 2 seconds, then (ii) measurement is performed in a frequency range of 4 kHz with the largest amplitude as the center, with a sweep time of 2 seconds, further (iii) measurement is performed at the end in a frequency range of 1 kHz with a sweep time of 2 seconds to enhance accuracy, and (iv) a frequency at the largest amplitude is detected, so as to measure the resonance frequency (see FIG. 9). In this case, the total sweep time of 6 seconds is necessary.

Figure 8:
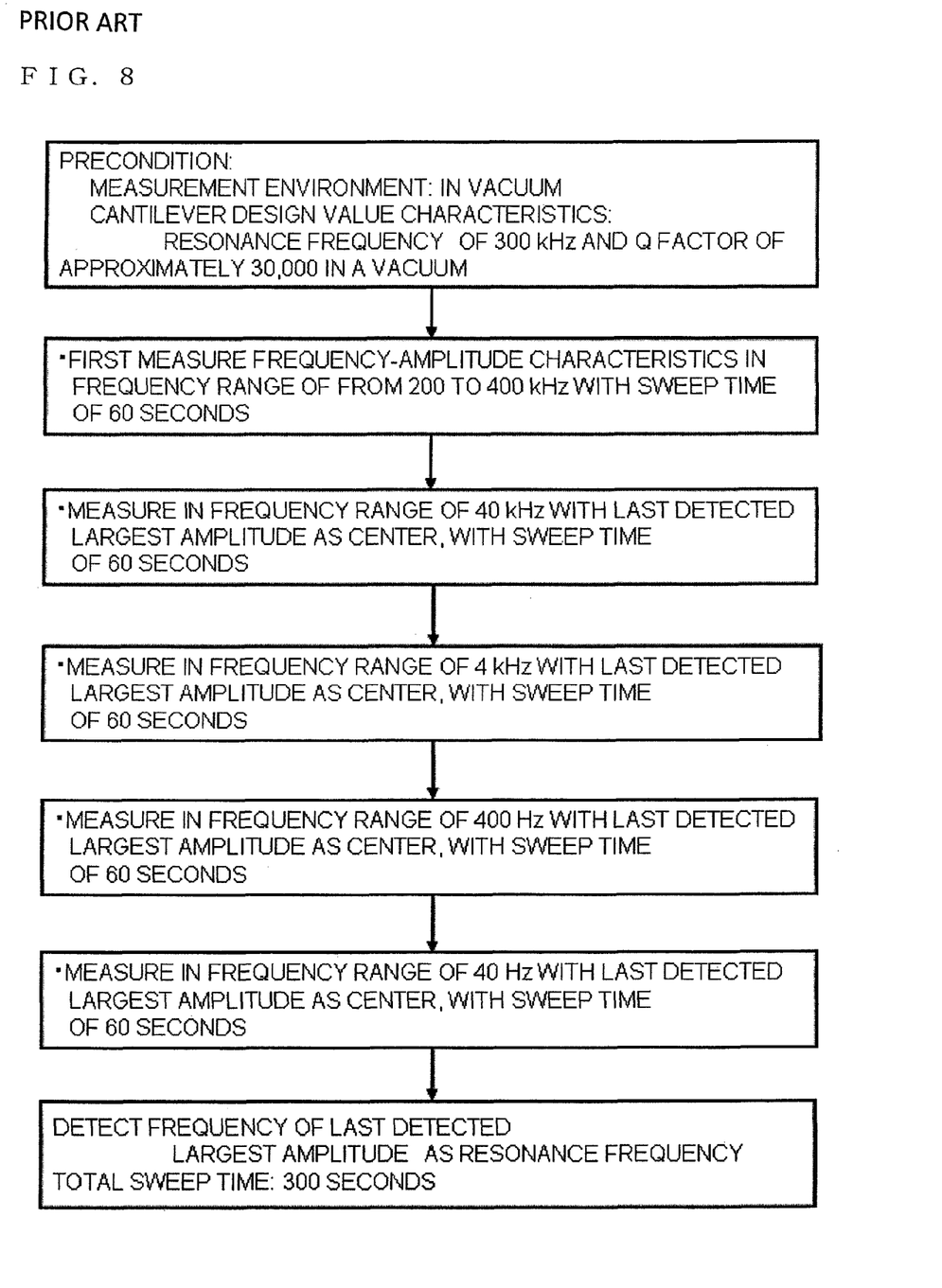
FIG. 8 illustrates a procedure of conventional and general measurement of frequency-amplitude characteristics in a vacuum.

FIG. 8 is a diagram illustrating a procedure of the conventional and general measurement of frequency-amplitude characteristics in a vacuum. Through use of a common cantilever having a design value of a resonance frequency of 300 kHz and an expected value of Q factor of approximately 30,000, which is manufactured in a vacuum, (i) the frequency-amplitude characteristics is measured first in a frequency range of from 200 to 400 kHz with a sweep time of 60 seconds, then (ii) measurement is performed in a frequency range of 40 kHz with the last detected largest amplitude as the center, with a sweep time of 60 seconds, (iii) measurement is performed in a frequency range of 4 kHz with the last detected largest amplitude as the center, with a sweep time of 60 seconds, (iv) measurement is performed in a frequency range of 400 Hz with the last detected largest amplitude as the center, with a sweep time of 60 seconds, (v) measurement is performed in a frequency range of 40 Hz with the last detected largest amplitude as the center, with a sweep time of 60 seconds, and (vi) a frequency at the largest amplitude is detected, so as to measure the resonance frequency. In this case, the total sweep time of 300 seconds is necessary. Because the Q factor is large in the case of the measurement is performed in a vacuum, the sweep time that is several ten to several hundred times the sweep time in the air is necessary.

When the Q factor of resonating is big, the sweep time is lengthened, and it must be in steady state vibration to detect a precise resonance frequency. When the resonance frequency and the Q factor of the cantilever are unknown, the sweep time and the frequency range cannot be appropriately estimated. Therefore, it is necessary to measure the frequency-amplitude characteristics under the condition of sweeping slowly in a wide frequency range. Even when the design values of a resonance frequency and a Q factor of the cantilever in the air are known, a resonance frequency and a Q factor for use in a solution have largely different values, which are thus difficult to estimate. In addition, the resonance frequency in a vacuum has a value similar to that in the air, but the Q factor in a vacuum is apt to be several ten to several hundred times that in the air, which requires a long time for measurement. In addition, it is difficult to estimate the value.

In addition, because a response delay occurs in a short time sweep, an error occurs in detecting the resonance frequency. When the Q factor is large (in a vacuum or in a light gas), the error is apt to increase.

It is known that when an SPM is used in a vacuum, viscosity resistance due to the air is not generated, and the Q factor becomes approximately several ten to several hundred times that in the air. Therefore, measurement of frequency-amplitude characteristics in a vacuum requires a much longer sweep time that is approximately several ten to several hundred times that in the air.

Therefore, when the conventional measurement of frequency-amplitude characteristics is performed on a cantilever having unknown vibration characteristics, it is necessary to judge whether to perform the measurement taking a long period of time for safety or to perform low accuracy measurement in a short period of time. Thus, it is difficult to perform high accuracy measurement in a short period of time.

In addition, as another problem, even when the measurement is performed in a long period of time, a plurality of peaks may often occur in a vicinity of a primary resonance frequency of the cantilever, and hence a true resonance frequency may not be selected.

In addition, when the excitation frequency is swept to activate a vibrator so as to vibrate the cantilever, peripheries of the vibrator that are mechanically connected to the vibrator (a cantilever holder, a slope block, and the like) are also vibrated so that a secondary vibration may occur. The secondary vibration may also affect vibration of the cantilever, and may generate an amplitude peak at a frequency other than the resonance frequency of the cantilever. Then, a detection error of the resonance frequency of the cantilever may be caused.

SUMMARY OF THE INVENTION

The present invention has been made in view of the above-mentioned problems, and an object thereof is to measure a resonance frequency of a cantilever in a short period of time with high accuracy. Another object is to detect a secondary resonance frequency at the same time so as to discriminate whether or not the peak indicates a primary resonance frequency.

The present invention adopts the following configurations in order to solve the problems described above.

Specifically, according to the present invention, there is provided a method of measuring vibration characteristics of a cantilever in a scanning probe microscope (SPM), the scanning probe microscope including: the cantilever; a vibrator portion for vibrating the cantilever; an excitation signal generator for supplying an excitation signal to the vibrator portion; a displacement detector for detecting a displacement of the cantilever; an AC to DC conversion mechanism for converting an AC signal indicating an amplitude of the displacement output from the displacement detector into a DC level signal; and a frequency vibration characteristics detection mechanism for measuring the amplitude of the displacement of the cantilever with respect to an excitation frequency, the method including: generating a forward and backward frequency sweep signal from the excitation signal generator in a frequency range including a resonance frequency of the cantilever in a short period of time that is reduced by "a factor of several tens to several hundreds" as compared to the conventional measurement time; vibrating the cantilever by the vibrator portion; measuring frequencies at the largest amplitude in a forward path and in a backward path; and detecting an intermediate value between the measured frequencies as the resonance frequency of the cantilever.

The method of measuring vibration characteristics of a cantilever further includes: newly generating, based on the last detected resonance frequency, a forward and backward frequency sweep signal in a new frequency range narrower than the frequency range including the last detected resonance frequency; vibrating the cantilever by the vibrator portion; newly measuring frequencies at the largest amplitude in the forward path and in the backward path; detecting an intermediate value between the measured frequencies as a new resonance frequency of the cantilever; and repeating the above steps at least once so as to detect the resonance frequency of the cantilever with improved accuracy.

In addition, because the present invention enables high speed sweep even in a wide frequency range, it becomes possible to detect the primary resonance frequency and the secondary resonance frequency of the cantilever simultaneously in a short period of time.

Further, it is known that there is the secondary resonance frequency at a frequency close to 6.3 times the primary resonance frequency. Therefore, by checking presence or absence of the secondary resonance frequency, it becomes possible to judge whether or not the resonance frequency is truly the primary resonance frequency.

The last detected primary resonance frequency and the secondary resonance frequency are simultaneously detected. After that, forward and backward sweep is performed at least once repeatedly with respect to each of the resonance frequencies in a narrow frequency range. Thus, it becomes possible to detect the primary resonance frequency and the secondary resonance frequency of the cantilever with improved accuracy.

When the cantilever has a cantilever spring shape, it is known that an amplitude peak of the secondary resonance frequency occurs at a frequency close to 6.3 times the primary resonance frequency. Therefore, when the primary resonance frequency is detected, it is checked whether or not there is a secondary resonance frequency that is 6.3 times the primary resonance frequency. Thus, it is possible to prevent a detection error of the resonance frequency.

According to the present invention, the following effects can be obtained.

Figure 6:
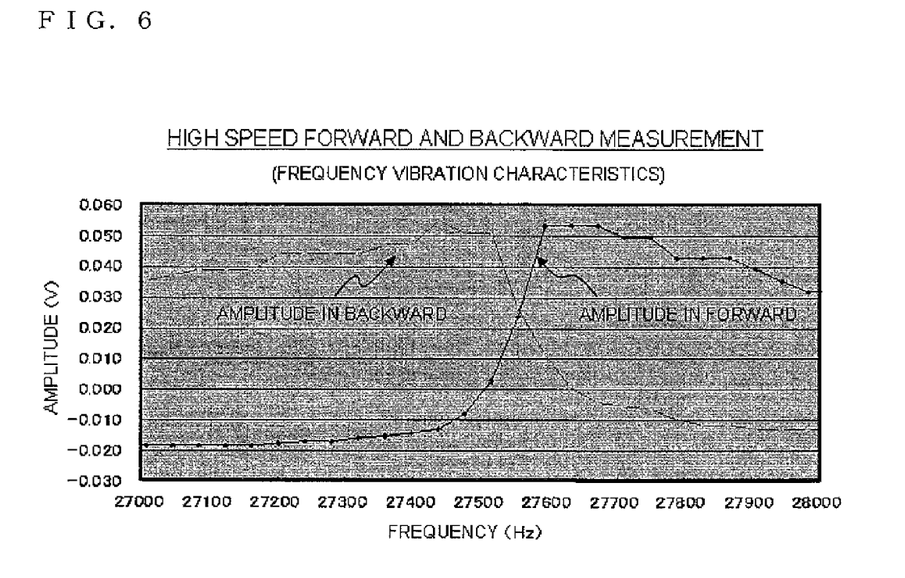
FIG. 6 illustrates an example of forward and backward measurement of frequency vibration characteristics (Q curve) at high speed according to the present invention.

The present invention has been made based on the finding that when the forward and backward sweep is performed, an error due to high speed sweep occurs as the same degree of delay in the forward path and in the backward path. Therefore, frequencies at the largest amplitude in the forward path and in the backward path are measured, and an intermediate value between the measured frequencies is detected as a resonance frequency of the cantilever. Thus, a measurement time of the resonance frequency with small error can be reduced by a factor of several tens to several hundreds as compared to that in the conventional measurement with high accuracy (see FIG. 6).

In addition, according to the measuring method of the present invention, the measurement can be performed in a very short period of time. Considering the fact that the measurement time of the method of the present invention is reduced (by a factor of several tens to several hundreds) as compared to that of the conventional method, it is possible to perform average calculation a plurality of times so that the accuracy can be more improved.

In addition, the present invention is useful particularly when the SPM is used in a vacuum in which the Q factor becomes several ten to several hundred of times larger than that in the air. Thus, the sweep time for measuring frequency-amplitude characteristics can be reduced to a very short period of time.

In this way, according to the present invention, even when a plurality of peaks occur in a vicinity of the primary resonance frequency of the cantilever so that the true resonance frequency cannot be selected, it is possible to judge whether or not the resonance frequency is truly the primary resonance frequency by comparing the primary resonance frequency with the secondary resonance frequency, which can be measured in a short period of time. Therefore, misrecognition of the frequency can be prevented, and it is also expected that a failure of measurement can be prevented.

In particular, in a measuring method using the SPM using the primary resonance frequency and the secondary resonance frequency (for example, shape measurement in a non-contact mode is performed by FM control at the primary resonance frequency, and KFM measurement is performed at the secondary resonance frequency), the present invention is very effective when the measurement at the primary resonance frequency and the measurement at the secondary resonance frequency are performed simultaneously.

DETAILED DESCRIPTION OF THE PREFERRED EMBODIMENTS

Figure 1A:
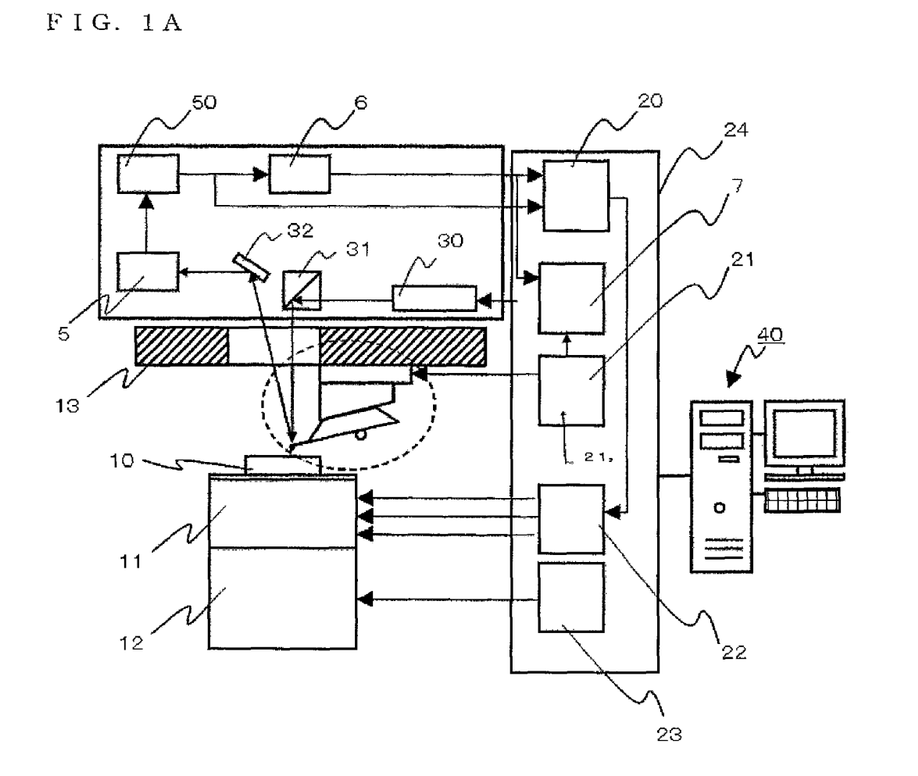
FIG. 1A is a block diagram of a scanning probe microscope according to the present invention.
Figure 1B:
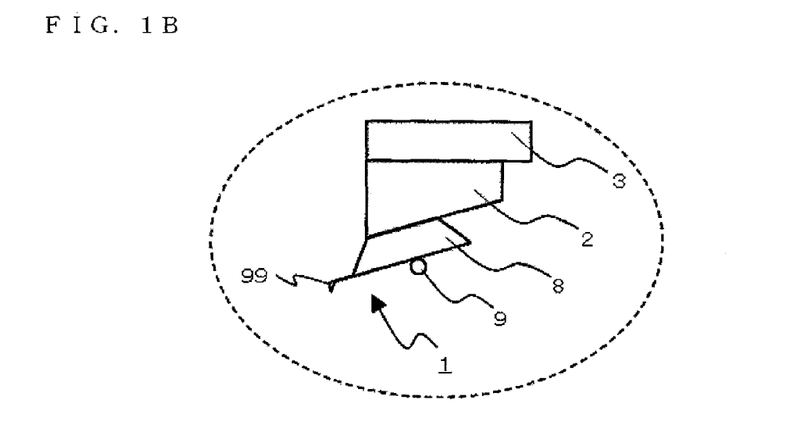
FIG. 1B is an enlarged view of a cantilever of FIG. 1A.

Hereinafter, a cantilever and a probe microscope according to a first embodiment of the present invention are described with reference to FIGS. 1A and 1B. It is noted that in the following description of FIGS. 1A and 1B, scales thereof are changed as necessary so that each member can be recognized in size.

The scanning probe microscope of this embodiment is constituted as follows. A cantilever 1 contacts with a side face of a cantilever tip portion 8 and constitutes a structure of a cantilever spring. The cantilever tip portion 8 is pressed to a slope block 2 by a cantilever tip portion holder 9, and the slope block 2 is fixed to a vibrator 3. The vibrator 3 is excited by an electric signal supplied from an excitation signal generator 4 so as to vibrate the cantilever. A vertical displacement of a probe 99 of the cantilever 1 is detected as follows. A laser beam emitted from a laser source 30 is reflected by a dichroic mirror 31 and is projected to a backside of the cantilever 1 so that the vertical movement of the cantilever 1 affects a change of a light path of the reflected laser beam, which is reflected by a mirror 32 and is detected by a displacement detector 5 as an electric signal indicating a movement of the cantilever 1. A vibration amplitude of the cantilever 1 corresponds to an amplitude of the electric signal from the displacement detector 5. The amplitude of the electric signal is converted into a DC level signal corresponding to the magnitude of the amplitude by an AC to DC conversion mechanism 6, and the signal is supplied to a frequency vibration characteristics detection mechanism 7 of a probe microscope controller 24. The electric signal from the excitation signal generator 4 is also supplied to the frequency vibration characteristics detection mechanism 7, and frequency vibration characteristics are sent to a computer 40. The DC level signal indicating the magnitude of the vibration amplitude of the cantilever 1 is supplied to a Z control circuit 20, and a control signal is sent to a Z signal portion of an XYZ output amplifier 22 for matching with a target amplitude. A scanner 11 is moved so that the vibration amplitude of the cantilever 1 becomes the target amplitude. While controlling a contact force of the probe 99 contacting with a sample 10, the scanner 11 is moved for scanning based on X and Y output signals from the output amplifier 22 so as to map a shape or a physical value of the surface.

The probe microscope controller 24 and the computer 40 can communicate data at high speed, and the computer 40 can control operating conditions of circuits in the probe microscope controller 24. The computer 40 reads and controls measured data so as to realize measurement of the frequency vibration characteristics, measurement of the surface shape, measurement of surface physical property, measurement of focus curve, and the like.

The probe microscope operates as follows. With respect to a displacement in a scanner surface, on the computer 40, (i) a three-dimensional shape image is displayed based on a displacement of a scanner height, (ii) a phase image is displayed based on a phase value in a resonance state, (iii) an error signal image is displayed based on a difference between the vibration amplitude and a target value, and (iv) a multifunction measurement image is displayed based on a physical value between the probe and the sample, to thereby perform analysis and processing.

The frequency vibration characteristics are measured before measurement of a sample surface with the scanning probe microscope, and the result is used for setting an optimal condition for the measurement. When FM control is performed, an initial value of a frequency for self-oscillation is set. When AM control is performed, an excitation frequency and an excitation voltage are set. When phase control is performed, a frequency range in which a phase signal can be detected is set.

Next, a measuring method using the scanning probe microscope of this embodiment is described.

Figure 2:
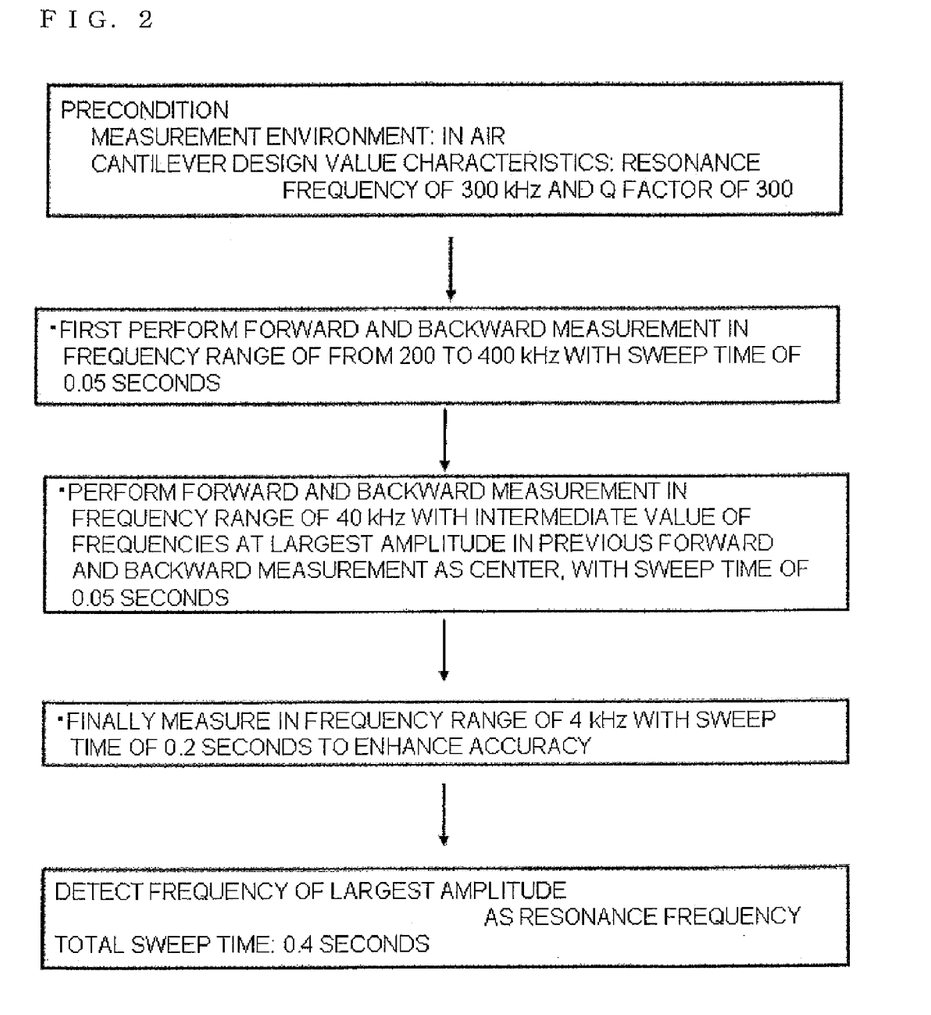
FIG. 2 illustrates a procedure of general measurement of frequency-amplitude characteristics in the air according to the present invention.

FIG. 2 is a diagram illustrating a procedure of general measurement of frequency-amplitude characteristics in the air according to the present invention. In the air, through use of a common cantilever manufactured in accordance with design values of a resonance frequency of 300 kHz and a Q factor of approximately 300, (i) forward and backward measurement is first performed in a frequency range of from 200 to 400 kHz with a sweep time of 0.05 seconds, (ii) then, forward and backward measurement is performed in a frequency range of 40 kHz with an intermediate value of the frequencies at the largest amplitude in the previous forward and backward measurement as the center with a sweep time of 0.05 seconds, and (iii) finally measurement is performed in a frequency range of 4 kHz with a sweep time of 0.2 seconds to enhance accuracy, to thereby detect an intermediate value of the frequencies at the largest amplitude and measure the resonance frequency. In this case, the total sweep time becomes 0.4 seconds.

Figure 3:
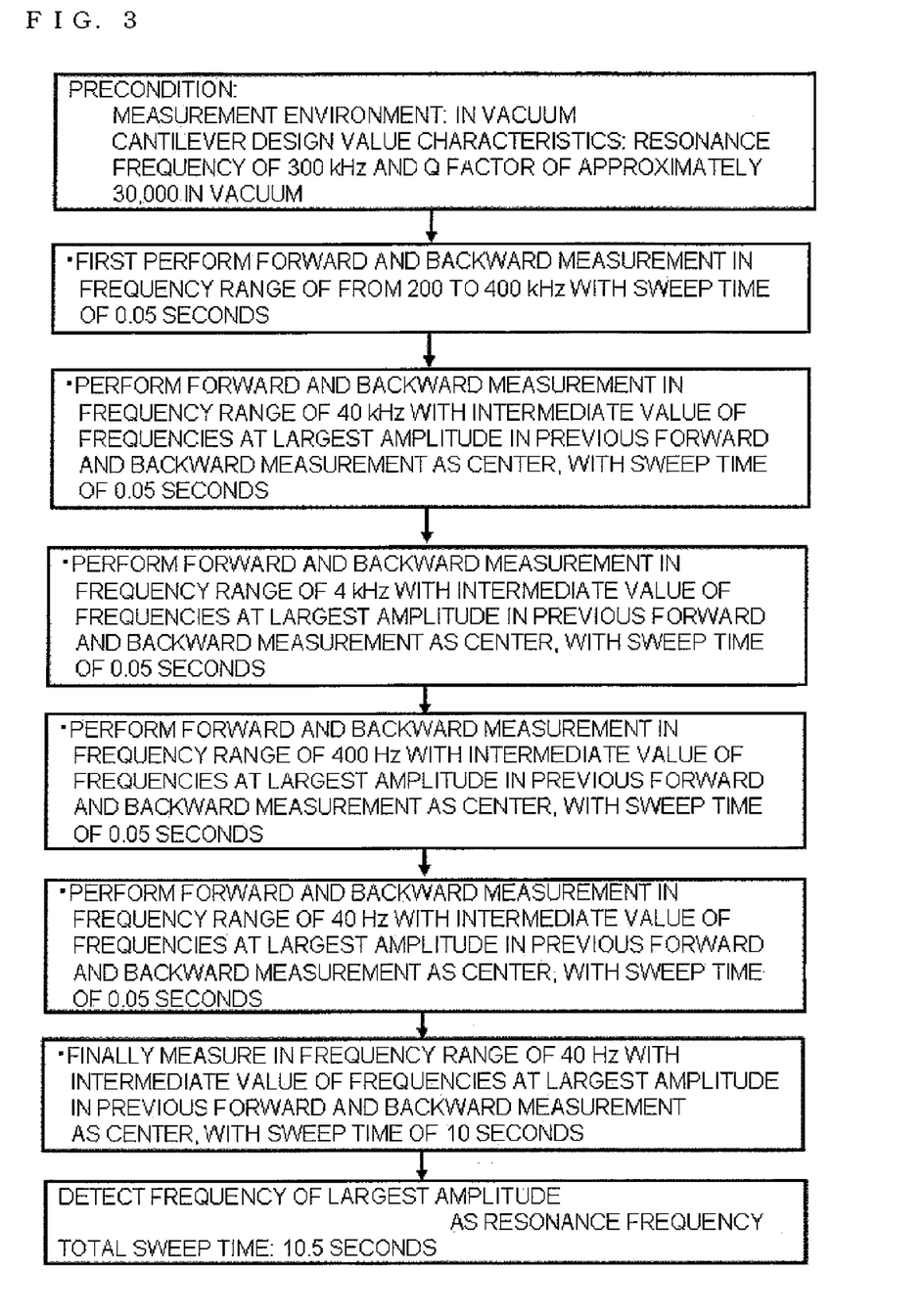
FIG. 3 illustrates a procedure of general measurement of frequency-amplitude characteristics in a vacuum according to the present invention.

Next, FIG. 3 is a diagram illustrating a procedure of general measurement of frequency-amplitude characteristics in a vacuum according to the present invention. In a vacuum, through use of a common cantilever manufactured in accordance with a design value of a resonance frequency of 300 kHz and having an expected Q factor of approximately 30,000, (i) forward and backward measurement is first performed in a frequency range of from 200 to 400 kHz with a sweep time of 0.05 seconds, (ii) then, forward and backward measurement is performed in a frequency range of 40 kHz with an intermediate value of the frequencies at the largest amplitude in the previous forward and backward measurement as the center, with a sweep time of 0.05 seconds, (iii) forward and backward measurement is performed in a frequency range of 4 kHz with the intermediate value of the frequencies at the largest amplitude in the previous forward and backward measurement as the center, with a sweep time of 0.05 seconds, (iv) forward and backward measurement is performed in a frequency range of 400 Hz with the intermediate value of the frequencies at the largest amplitude in the previous forward and backward measurement as the center, with a sweep time of 0.05 seconds, (v) forward and backward measurement is performed in a frequency range of 40 Hz with the intermediate value of the frequencies at the largest amplitude in the previous forward and backward measurement as the center, with a sweep time of 0.05 seconds, and (vi) finally measurement is performed in a frequency range of 40 Hz with the intermediate value of the frequencies at the largest amplitude in the previous forward and backward measurement as the center, with a sweep time 10 seconds, to thereby detect a frequency at the largest amplitude as the resonance frequency. In this case, the total sweep time becomes 10.5 seconds.

Figure 4:
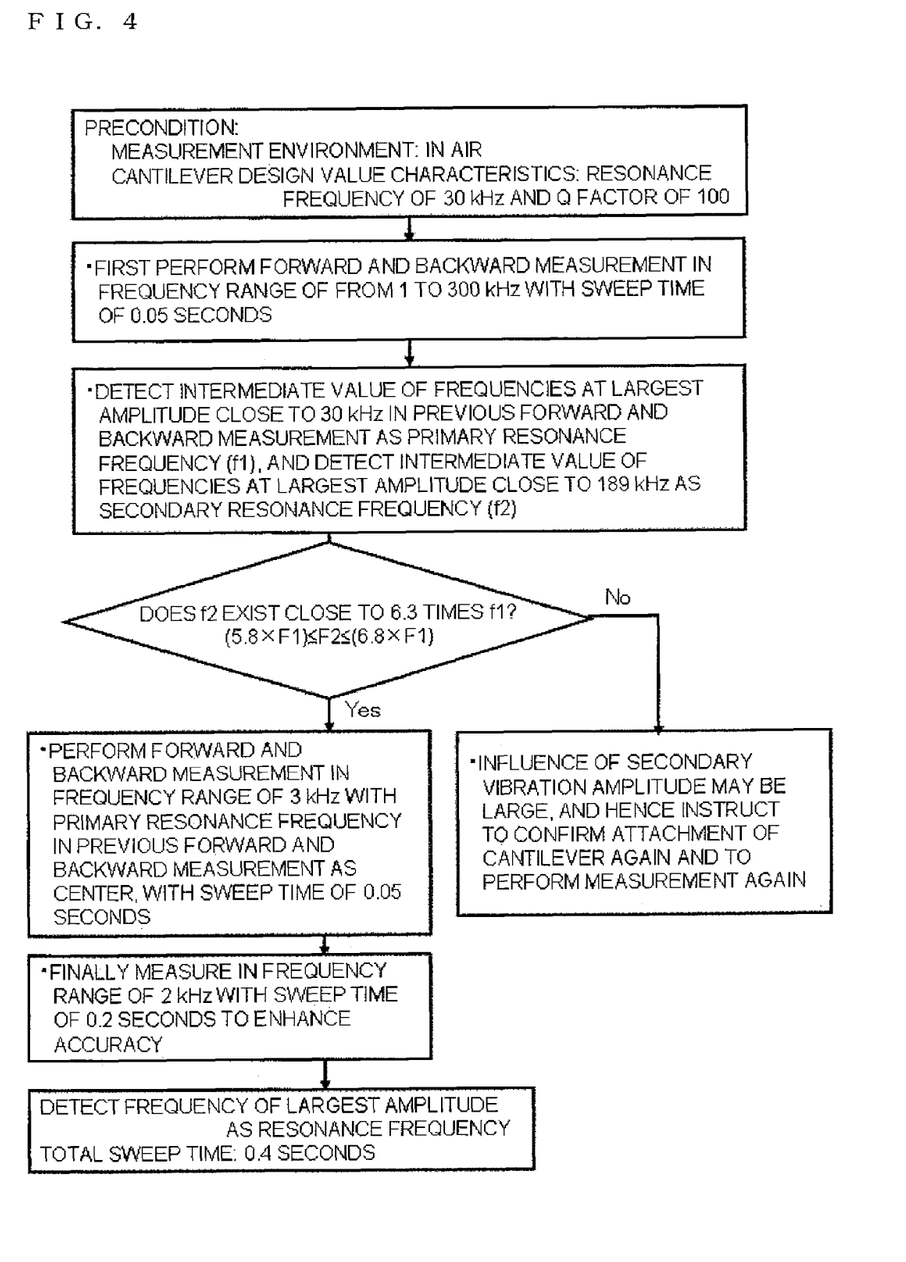
FIG. 4 illustrates a procedure of measurement of frequency-amplitude characteristics in the air according to the present invention, which includes error judgment of a primary resonance frequency.

Next, FIG. 4 is a diagram illustrating a procedure of measurement of frequency-amplitude characteristics in the air, which includes error judgment of the primary resonance frequency according to the present invention. In the air, through use of a common cantilever manufactured in accordance with design values of a resonance frequency of 30 kHz and a Q factor of approximately 100, (i) forward and backward measurement is first performed in a frequency range of 1 to 300 kHz with a sweep time of 0.05 seconds, (ii) then, an intermediate value of the frequencies at the largest amplitude close to 30 kHz in the previous forward and backward measurement is detected as a primary resonance frequency (f1), and an intermediate value of the frequencies at the largest amplitude close to 189 kHz is detected as a secondary resonance frequency (f2), (iii) when the condition of Expression (1) indicating that f2 exists close to 6.3 times the primary resonance frequency (f1) is satisfied, then the procedure proceeds to (iv), and otherwise attachment of the cantilever is confirmed again and measurement is performed again (an influence of the secondary vibration amplitude may be large), (iv) forward and backward measurement is performed in a frequency range of 3 kHz with the primary resonance frequency in the previous forward and backward measurement as the center, with a sweep time of 0.05 seconds, and (v) finally measurement is performed in a frequency range of 2 kHz with a sweep time of 0.2 seconds to enhance accuracy, to thereby detect a frequency at the largest amplitude as the resonance frequency. In this case, the total sweep time becomes 0.4 seconds.

[Expression 1]

$$(5.8 \times f1) \leq f2 \leq (6.8 \times f1) \quad (1)$$

Figure 5:
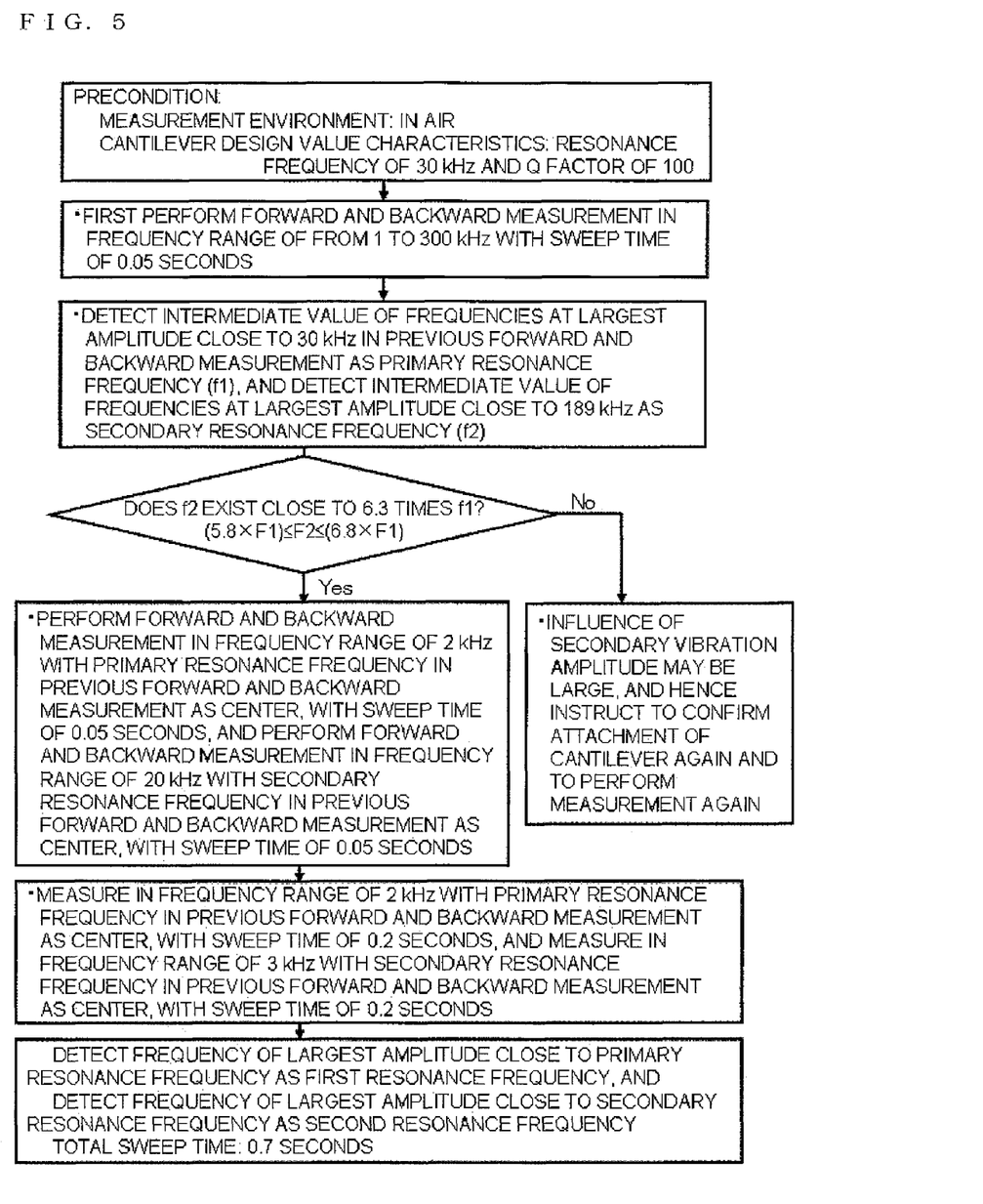
FIG. 5 illustrates a procedure of measurement of the primary resonance frequency and a secondary resonance frequency in the air according to the present invention.

Next, FIG. 5 is a diagram illustrating a procedure of measurement of the primary resonance frequency and the secondary resonance frequency in the air according to the present invention. In the air, through use of a common cantilever manufactured in accordance with design values of a resonance frequency of 30 kHz and a Q factor of approximately 100, (i) forward and backward measurement is first performed in a frequency range 1 to 300 kHz with a sweep time of 0.05 seconds, (ii) then, an intermediate value of the frequencies at the largest amplitude close to 30 kHz in the previous forward and backward measurement is detected as the primary resonance frequency (f1), and an intermediate value of the frequencies at the largest amplitude close to 189 kHz is detected as the secondary resonance frequency (f2), (iii) when the condition of Expression (1) indicating that f2 exists close to 6.3 times the primary resonance frequency (f1) is satisfied, then the procedure proceeds to (iv), and otherwise attachment of the cantilever is confirmed again and measurement is performed again (an influence of the secondary vibration amplitude may be large), (iv) forward and backward measurement is performed in a frequency range of 3 kHz with the primary resonance frequency in the previous forward and backward measurement as the center, with a sweep time of 0.05 seconds, and forward and backward measurement is performed in a frequency range of 20 kHz with the secondary resonance frequency in the previous forward and backward measurement as the center, with a sweep time of 0.05 seconds, (vi) measurement is performed in a frequency range of 2 kHz with the primary resonance frequency in the previous forward and backward measurement as the center, with a sweep time of 0.2 seconds, and measurement is performed in a frequency range of 3 kHz with the secondary resonance frequency in the previous forward and backward measurement as the center, with a sweep time of 0.2 seconds, and (vii) a frequency at the largest amplitude close to the primary resonance frequency is detected as a first resonance frequency, and a frequency at the largest amplitude close to the secondary resonance frequency is detected as a second resonance frequency. In this case, the total sweep time becomes 0.7 seconds.

As described above, according to the method of measuring vibration characteristics of a cantilever according to the present invention, regardless of measurement in the air or measurement in a vacuum, the measurement can be performed within approximately 10 seconds. Even in the conventional case of high Q factor, the measurement can be performed in a very short period of time.

What is claimed is:
1. A method of measuring vibration characteristics of a cantilever in a scanning probe microscope (SPM),
the scanning probe microscope including:
the cantilever;
a vibrator portion for vibrating the cantilever;
an excitation signal generator for supplying an excitation signal to the vibrator portion;
a displacement detector for detecting a displacement of the cantilever;
an AC to DC conversion mechanism for converting an AC signal indicating an amplitude of the displacement output from the displacement detector into a DC level signal; and
a frequency vibration characteristics detection mechanism for measuring the amplitude of the displacement of the cantilever with respect to an excitation frequency,
the method comprising:
generating a forward and backward frequency sweep signal from the excitation signal generator in a frequency range including a resonance frequency of the cantilever;
vibrating the cantilever by the vibrator portion;
directly measuring the largest amplitude of the displacement of the cantilever in a forward path and in a backward path; and
detecting as the resonance frequency of the cantilever an intermediate value of a frequency between frequencies measured on the basis of the directly measured largest amplitude of the displacement of the cantilever.

2. A method of measuring vibration characteristics of a cantilever according to claim 1, further comprising:
newly generating, based on the detected resonance frequency, a forward and backward frequency sweep signal in a new frequency range narrower than the frequency range including the resonance frequency;
vibrating the cantilever by the vibrator portion;
newly directly measuring the largest amplitude of a displacement of the cantilever in the forward path and in the backward path;
detecting as a new resonance frequency of the cantilever an intermediate value of a frequency between frequencies measured on the basis of the newly directly measured largest amplitude of the displacement of the cantilever; and repeating the above steps at least once so as to detect the resonance frequency of the cantilever.

3. A method of measuring vibration characteristics of a cantilever according to claim 1, further comprising:
generating a second forward and backward frequency sweep signal from the excitation signal generator in a frequency range including a primary resonance frequency of the cantilever and a secondary resonance frequency close to approximately 6.3 times the primary resonance frequency;
vibrating the cantilever by the vibrator portion;
directly measuring the largest amplitude of a displacement of the cantilever in a forward path and in a backward path on a low frequency side;
detecting as the primary resonance frequency of the cantilever an intermediate value of a frequency between frequencies measured on the basis of the directly measured largest amplitude in the forward path and in the backward path on the low frequency side;
directly measuring the largest amplitude in a forward path and in a backward path close to 6.3 times the primary resonance frequency; and
detecting as the secondary resonance frequency of the cantilever an intermediate value of a frequency between frequencies measured on the basis of the directly measured largest amplitude in the forward path and in the backward path close to 6.3 times the primary resonance frequency.

4. A method of measuring vibration characteristics of a cantilever according to claim 3, further comprising:
based on the detected primary resonance frequency and the secondary resonance frequency close to approximately 6.3 times the primary resonance frequency,
measuring a primary resonance frequency in a new frequency range narrower than the frequency range including the detected primary resonance frequency;
measuring a secondary resonance frequency in a new frequency range narrower than the frequency range including the detected secondary resonance frequency;
newly generating a forward and backward frequency sweep signal;
vibrating the cantilever by the vibrator portion;
newly directly measuring the largest amplitude in the forward path and in the backward path in the measurement of the primary resonance frequency and in the measurement of the secondary resonance frequency;
detecting as a new primary resonance frequency and a new secondary resonance frequency of the cantilever an intermediate value of a frequency between frequencies measured on the basis of the newly directly measured largest amplitude in the forward path and in the backward path in the measurement of the primary resonance frequency and in the measurement of the secondary resonance frequency; and
repeating the above steps at least once so as to detect the primary resonance frequency and the secondary resonance frequency of the cantilever.

5. A method of measuring vibration characteristics of a cantilever according to claim 3, wherein when the secondary resonance frequency close to 6.3 times the primary resonance frequency is not detected, the detected primary resonance frequency is judged to be an error of measurement.

6. A method of measuring vibration characteristics of a cantilever in a scanning probe microscope (SPM), comprising:
generating an excitation signal by a forward and backward frequency sweep signal in a frequency range including a resonance frequency of the cantilever;
vibrating the cantilever by supplying the excitation signal to a vibrating portion of the cantilever;
directly measuring the largest amplitude of a displacement of the cantilever in a forward path and in a backward path; and
detecting as the resonance frequency of the cantilever an intermediate value of a frequency between frequencies measured on the basis of the directly measured largest amplitude of the displacement of the cantilever.

7. A method according to claim 6, further comprising:
newly generating, based on the detected resonance frequency, a forward and backward frequency sweep signal in a new frequency range narrower than the frequency range including the resonance frequency;
vibrating the cantilever by supplying to the vibrating portion of the cantilever an excitation signal corresponding to the newly generated forward and backward frequency sweep signal;
newly directly measuring the largest amplitude of a displacement of the cantilever in the forward path and in the backward path;
detecting as a new resonance frequency of the cantilever an intermediate value of a frequency between frequencies measured on the basis of the newly directly measured largest amplitude of the displacement of the cantilever; and
repeating the above steps at least once so as to detect the resonance frequency of the cantilever.

8. A method according to claim 6, further comprising:
generating a second forward and backward frequency sweep signal in a frequency range including a primary resonance frequency of the cantilever and a secondary resonance frequency close to approximately 6.3 times the primary resonance frequency;
vibrating the cantilever by supplying the vibrator portion of the cantilever an excitation signal corresponding to the second forward and backward frequency sweep signal;
directly measuring the largest amplitude of a displacement of the cantilever in a forward path and in a backward path on a low frequency side;
detecting as the primary resonance frequency of the cantilever an intermediate value of a frequency between frequencies measured on the basis of the directly measured largest amplitude in the forward path and in the backward path on the low frequency side;
directly measuring the largest amplitude in a forward path and in a backward path close to 6.3 times the primary resonance frequency; and
detecting as the secondary resonance frequency of the cantilever an intermediate value of a frequency between frequencies measured on the basis of the directly measured largest amplitude in the forward path and in the backward path close to 6.3 times the primary resonance frequency.

9. A method of measuring vibration characteristics of a cantilever according to claim 8, further comprising:
based on the detected primary resonance frequency and the secondary resonance frequency close to approximately 6.3 times the primary resonance frequency,
measuring a primary resonance frequency in a new frequency range narrower than the frequency range including the detected primary resonance frequency;

measuring a secondary resonance frequency in a new frequency range narrower than the frequency range including the detected secondary resonance frequency;

newly generating a forward and backward frequency sweep signal;

vibrating the cantilever by the vibrator portion;

newly directly measuring the largest amplitude in the forward path and in the backward path in the measurement of the primary resonance frequency and in the measurement of the secondary resonance frequency;

detecting as a new primary resonance frequency and a new secondary resonance frequency of the cantilever an intermediate value of a frequency between frequencies measured on the basis of the newly directly measured largest amplitude in the forward path and in the backward path in the measurement of the primary resonance frequency and in the measurement of the secondary resonance frequency; and repeating the above steps at least once so as to detect the primary resonance frequency and the secondary resonance frequency of the cantilever.

10. A method of measuring vibration characteristics of a cantilever according to claim 8, wherein when the secondary resonance frequency close to 6.3 times the primary resonance frequency is not detected, the detected primary resonance frequency is judged to be an error of measurement.

11. A method of measuring vibration characteristics of a cantilever in a scanning probe microscope (SPM), the scanning probe microscope including:
    the cantilever;
    a vibrator portion for vibrating the cantilever;
    an excitation signal generator for supplying an excitation signal to the vibrator portion;
    a displacement detector for detecting a displacement of the cantilever;
    an AC to DC conversion mechanism for converting an AC signal indicating an amplitude of the displacement output from the displacement detector into a DC level signal; and
    a frequency vibration characteristics detection mechanism for measuring the amplitude of the displacement of the cantilever with respect to an excitation frequency, the method comprising:

generating a forward and backward frequency sweep signal from the excitation signal generator in a frequency range including a resonance frequency of the cantilever;

vibrating the cantilever by the vibrator portion;

measuring frequencies at the largest amplitude in a forward path and in a backward path;

detecting an intermediate value between the measured frequencies as the resonance frequency of the cantilever;

generating a second forward and backward frequency sweep signal from the excitation signal generator in a frequency range including a primary resonance frequency of the cantilever and a secondary resonance frequency close to approximately 6.3 times the primary resonance frequency;

vibrating the cantilever by the vibrator portion;

measuring frequencies at the largest amplitude of a displacement of the cantilever in a forward path and in a backward path on a low frequency side;

detecting an intermediate value between the measured frequencies as the primary resonance frequency of the cantilever;

measuring frequencies at the largest amplitude in a forward path and in a backward path close to 6.3 times the primary resonance frequency; and detecting an intermediate value between the measured frequencies as the secondary resonance frequency of the cantilever.

12. A method of measuring vibration characteristics of a cantilever according to claim 11, further comprising:

based on the detected primary resonance frequency and the secondary resonance frequency close to approximately 6.3 times the primary resonance frequency, measuring a primary resonance frequency in a new frequency range narrower than the frequency range including the detected primary resonance frequency;

measuring a secondary resonance frequency in a new frequency range narrower than the frequency range including the detected secondary resonance frequency;

newly generating a forward and backward frequency sweep signal;

vibrating the cantilever by the vibrator portion;

newly measuring frequencies at the largest amplitude in the forward path and in the backward path in the measurement of the primary resonance frequency and in the measurement of the secondary resonance frequency;

detecting as a new primary resonance frequency and a new secondary resonance frequency of the cantilever an intermediate value of a frequency between frequencies measured on the basis of the newly directly measured largest amplitude in the forward path and in the backward path in the measurement of the primary resonance frequency and in the measurement of the secondary resonance frequency; and repeating the above steps at least once so as to detect the primary resonance frequency and the secondary resonance frequency of the cantilever.

13. A method of measuring vibration characteristics of a cantilever according to claim 11, wherein when the secondary resonance frequency close to 6.3 times the primary resonance frequency is not detected, the detected primary resonance frequency is judged to be an error of measurement.

* * * * *